United States Patent [19]

Tashiro et al.

[11] 3,875,126

[45] Apr. 1, 1975

[54] PRODUCTION OF ALPHA-OLEFIN POLYMERS

[75] Inventors: Kijuro Tashiro; Masuzo Yokoyama; Sadao Kitagawa; Shoichi Masukawa, all of Ibaraki-ken, Japan

[73] Assignee: Mitsubishi Petrochemical Company Limited, Tokyo, Japan

[22] Filed: Jan. 12, 1973

[21] Appl. No.: 323,080

[30] Foreign Application Priority Data

Jan. 14, 1972 Japan................................. 47-5891

[52] U.S. Cl.... 260/88.2 R, 260/93.7, 260/94.9 CA, 260/94.9 CB, 260/94.9 CC, 260/94.9 CD, 260/94.9 C, 260/94.9 E
[51] Int. Cl........ C08f 15/04, C08f 19/02, C08f 3/02
[58] Field of Search..... 260/94.9 R, 94.9 B, 94.9 C, 260/94.9 CA, 94.9 CB, 94.9 CC, 93.1, 94.9 CD, 88.2 R, 93.7

[56] References Cited
UNITED STATES PATENTS 3,676,418  7/1972  Tashiro.......................... 260/94.9 C
3,701,763  10/1972  Wada et al...................... 260/94.9 C
3,732,197  5/1973  Kitagawa........................ 260/94.9 C
3,752,797  8/1973  Gordon et al.................. 260/94.9 C

OTHER PUBLICATIONS

Derwent Belgian Patent Report No. 34, 1969, Abst. of Belgian Pat. No. 728519

*Primary Examiner*—Joseph L. Schofer
*Assistant Examiner*—T. S. Gron
*Attorney, Agent, or Firm*—Wenderoth, Lind & Ponack

[57] ABSTRACT

An α-olefin is polymerized with another monomer through the use of a catalyst system prepared by combining: (I) a solid composition prepared by milling titanium trichloride in the presence of modifier, which is a halohydrocarbon, a silicon compound represented by the general formula $SiX_m' Y_{4-m}'$, where $X'$ is a halogen, $Y'$ is hydrogen, an alkyl group, an aryl group, an aralkyl group, an alkaryl group, or an alkoxyl group, and m is zero or the integer 1, 2, 3, or 4 (exclusive of $SiH_4$), or a halogen compound of a specific metal; (II) an organoaluminum compound; and (III) a cycloheptatriene compound, including salts of tropylium.

13 Claims, No Drawings

PRODUCTION OF ALPHA-OLEFIN POLYMERS

BACKGROUND OF THE INVENTION

1. Field of Art

This invention relates generally to α-olefin polymers and production thereof. More particularly, the invention relates to the production of crystalline poly-α-olefins through the use of improved catalysts of the so-called Ziegler type basically comprising a combination of a compound of a transition metal of Group IV, V, or VI of the periodic table and an organometal compound (including hydrides) of a metal of Group I, II, or III of the periodic table.

2. Prior Art 2-1. General

Representative examples of Ziegler catalysts are those based on titanium trichloride-trialkylaluminum and those based on titanium trichloride-dialkylaluminum halide.

With known catalysts of this type, however, it is not ordinarily possible to satisfy simultaneously the requirements for activity, which can be compared on the basis of yields of the polymers formed, and stereospecificity, which can be compared on the basis of the content of crystalline polymers within the polymers formed. For example, when polymerizing propylene, a catalyst system in which a trialkylaluminum is used as mentioned above is advantageous in that its activity is high but is disadvantageous in that the content of crystalline polymer within the polypropylene formed is low, being of the order of from 70 to 80 percent. On the other hand, a catalyst system in which a dialkylaluminum halide is used as mentioned above has a remarkably lower activity than the above mentioned catalyst, that is, an activity which is of the order of one-fourth that of the former catalyst, but is characterized in that it produces a crystalline polymer content as high as 90 percent.

Obviously, it is generally desirable that a catalyst of this type has a high activity and, at the same time, an excellent stereospecificity. It is considered that the need for such a catalyst will become an acute problem particularly in vapor-phase polymerization of α-olefins which is recently being developed. The reason for this is that, in general, the polymers formed frequently have low contents of crystalline polymers in vapor-phase polymerization in which high-activity catalysts are used.

2-2. Specific prior art

Relative to this problem, there have been certain processes proposed wherein mixtures prepared by co-milling titanium trichloride with various modifier compounds, particularly halogen compounds, are used as the titanium trichloride ingredient or component to be combined with the organoaluminum ingredient or component, principally in the following references.

a. Japanese Pat. Appln. No. 53946/1970: Halides of Se, Te, Sb, Cr, Au, Pd, and V
b. Japanese Pat. Appln. No. 52244/1971: Halomethanes, silanes, and halides of germanium
c. Japanese Pat. Appln. No. 95544/1971: Halogenated hydrocarbons In addition, processes wherein cycloheptatriene ring compounds are present in the catalyst system have been proposed, as in the following disclosures.

d. Dutch Pat. No. 69,02197: Cycloheptatriene, methyltropylether, etc.
e. Japanese Pat. Appln. No. 98524/1969: Tropylium salts and tropylium complexes
f. Japanese Pat. Appln. No. 74939/1971: Specific cycloheptatriene derivatives and toropolone compounds

SUMMARY OF THE INVENTION

It is an object of this invention to provide a process for producing α-olefin polymers of high crystalline polymer content through the use of a catalyst system of high activity. We have found that this object and other objects of this invention can be achieved through the use of a catalyst prepared by combining a titanium trichloride component comprising titanium trichloride co-milled with specific modifiers, an organoaluminum compound component, and a cycloheptatriene compound.

More specifically, the process for producing α-olefin polymers according to this invention, briefly summarized, is characterized in that an α-olefin is polymerized by causing it to contact a catalyst system prepared by combining the following components (I), (II), and (III):

I. A solid composition prepared by milling titanium trichloride in the presence of a modifier compound selected from the group consisting of the following compounds (1), (2), and (3):
  1. Halohydrocarbons
  2. Silicon compounds represented by the general formula $SiX_m' Y_{4-m}'$, where $X'$ is a halogen, $Y'$ is hydrogen, an alkyl group, an aryl group, an aralkyl group, an alkaryl group, or an alkoxyl group, and $m$ is zero or the integer 1, 2, 3 or 4 (exclusive of $SiH_4$).
  3. Halides of selenium, tellurium, antimony, chromium, gold, palladium, vanadium, and germanium.
II. An organoaluminum compound
III. A cycloheptatriene compound Thus, the process of this invention approximately corresponds to a combination of the process of the foregoing references (a), (b), and (c) and the process of the foregoing references (d), (e), and (f). By this combination, a synergism is frequently exhibited. Furthermore, it is interesting to note that, while the titanium trichloride co-milled with the above named modifiers (1), (2) and (3) is modified or changed to an extreme degree, the effect of adding a cycloheptatriene ring compound in the process of the inventions of the above references (d), (e), and (f) is evident even in a Ziegler catalyst having as one component thereof a modified titanium trichloride of this nature.

While the catalyst according to this invention can be used by and in various polymerization methods, the methods which achieve optimum utilization of the high effectiveness of this invention are the so-called solventless polymerization methods, particularly the vapor-phase polymerization method, whereby α-olefin polymers of excellent stereospecificities can be produced in high yields relative to the catalyst.

The nature, utility, and further features of this invention will be apparent from the following detailed description beginning with a consideration of general particulars and features and concluding with specific examples of practice illustrating preferred embodiments of the invention.

DETAILED DESCRIPTION

1. Catalyst 1-1. Modifier compound

Modifiers suitable for use according to this invention are the aforenamed compounds (1), (2), and (3). These compounds may be used in combinations of two or more thereof from the same group or from different groups, in which case, the optimum quantities and proportions as described hereinafter will, of course, become different.

For the halogens, the most typical examples are chlorine, bromine, and iodine, but chlorine is the most suitable on the point of economy.

Halogenated hydrocarbons (1)

These are haloderivatives of saturated or unsaturated aliphatic or alicyclic hydrocarbons or haloderivatives of aromatic hydrocarbons. The hydrocarbon moiety of these halohydrocarbons usually contains from 1 to 8 carbon atoms.

Specific examples thereof are carbon tetrachloride, chloroform, dichloromethane, ethyl chloride, 1,2-dichloroethane, 1,1,2,2-tetrachloroethane, hexachloroethane, 1,1,2,2-tetrabromoethane, 1-chloropropane, 1,3-dichloropropane, 1,2-dichloropropane, 1,2,3-trichloropropane, 1,3-dibromopropane, 1-bromobutane, dichlorobutanes, 1,5-dichloropentane, 1,6-dichlorohexane, tetrachloroethylene, 1,2-dibromoethylene, allyl chloride, allyl bromide, 1,3-dichloropropene, 2,3-dichloropropene, 1,3-dichlorobutene-2, 1,4-dichlorobutene-2, hexachlorobutadiene-1,3, hexachlorocyclopentadiene, hexachlorobenzene, benzyl chloride, and benzotrichloride.

Silicon compounds (2)

These are representable by the general formula $SiX'_m Y'_{4-m}$, where $X'$ is a halogen, $Y'$ is hydrogen, an alkyl group, an aryl group, an aralkyl group, an alkaryl group, or an alkoxyl group, and $m$ is zero or the integer 1, 2, 3, or 4. For the alkyl group (inclusive of cycloalkyl group), a lower alkyl group containing from about 1 to about 6 carbon atoms, particularly from 1 to 3 is suitable. For the aryl group, a phenyl group or a naphthyl group is suitable. For the aralkyl group or the alkaryl group, a combination of the above mentioned alkyl group and aryl group is suitable. For the alkoxyl group, one having an alkyl group as mentioned above is suitable.

Specific examples of suitable silicon compounds (2) are: silicon tetrachloride, trichlorosilane, methyltrichlorosilane, dichlorodimethylsilane, chlorotrimethylsilane, ethyltrichlorosilane, phenyltrichlorosilane, and dimethylethoxysilane. $SiH_4$ is not included.

Metal halides (3)

These are halides of selenium, tellurium, antimony, chromium, gold, palladium, vanadium, and germanium. For the halogen, chlorine is the most representative.

Specific examples of these compounds (3) are: selenium tetrachloride, tellurium tetrachloride, antimony trichloride, chromium dichloride, gold trichloride, palladium dichloride, vanadium trichloride, germanium tetrachloride, ethyltrichlorogermanium, phenyltrichlorogermanium, diethyldichlorogermanium, diphenyldichlorogermanium, triethylchlorogermanium, and triphenylchlorogermanium.

Since, among these compounds (3) sold on the market, there are some exhibiting deliquescence and some containing adsorbed moisture, these compounds should be used after they have been thoroughly dehydrated or dried.

1-2. Titanium trichloride

Ordinarily, the objects of the invention can be achieved by using a titanium trichloride of α-form. While the titanium trichloride is ordinarily produced by the reduction of titanium tetrachloride, the reducing agent used therein may be one which produces α-form titanium trichloride, such as hydrogen, metallic titanium, and a hydrogenated silicon compound. while it is possible for a titanium trichloride of another type to be present in admixed state depending on the preparation method, such admixture of a small quantity of titanium trichloride of different crystal form is permissible provided that the beneficial effect of the invention is evident.

The fact that a titanium trichloride is of α-form can be verified, for example, in the case where X-ray diffraction analysis is carried out, by the observation of extremely intense diffraction lines at angles of diffraction corresponding to lattice constants of 2.72 A, 5.85 A, 1.77 A, 2.12 A, etc.

1-3. Quantitative ratios

The proportion to be used of each of the above named modifier compounds with respect to the titanium trichloride may be selected at will within limits wherein its effect in co-milling is evident. While this proportion differs somewhat depending on the type of the modifier compound, the mole ratio of the modifier compound to the titanium trichloride is, in general, from 0.02 to 1.0.

Specific examples of the mole ratios for different modifier compounds are as follows:

$SiCl_4$, 0.02–1.0, preferably 0.05–0.6;
$HSiCl_3$, 0.05–0.1, preferably 0.1–0.6;
$CH_3 SiCl_3$, 0.02–0.5, preferably 0.05–0.3;
$(CH_3)_2 SiCl_2$, 0.02–0.5, preferably 0.05–0.3;
$(CH_3)_3 SiCl_2$, 0.02–0.5, preferably 0.05–0.4;
$C_2H_5SiCl_3$, 0.02–0.5, preferably 0.05–0.2;
$(CH_3)_3 Si(OC_2H_5)_2$, 0.02–0.5, preferably 0.05–0.2;
$CCl_4$, 0.02–0.3, preferably 0.05–0.2;
$CHCl_3$, 0.02–0.5, preferably 0.05–0.3;
$CH_2Cl_2$, 0.02–0.5, preferably 0.05–0.3;
$SbCl_3$, 0.01–0.5, preferably 0.03–0.3;
$SeCl_4$, 0.005–0.1, preferably 0.01–0.08;
$TeCl_4$, 0.005–0.1, preferably 0.01–0.08;
$CrCl_2$, 0.01–0.5, preferably 0.02–0.3;
$VCl_3$, 0.05–0.5, preferably 0.1–0.3;
$AuCl$, 0.01–0.3, preferably 0.02–0.1;
$PdCl_2$, 0.01–0.3, preferably 0.05–0.2;
$GeCl_4$, 0.02–0.3, preferably 0.05–0.2;

1-4. Co-milling

The co-milling of the titanium trichloride and the halohydrocarbon can be carried out by the aforementioned known methods or any other suitable method affording the desired results.

More specifically, it is possible to use any milling technique wherein milling can be accomplished in an inactive atmosphere. For example, it is possible to use a milling apparatus such as a virbarion mill, a rotary ball mill, or an impact mill in which an atmosphere such as that of argon, helium, or nitrogen can be maintained. In all cases, it is important to exercise care to prevent this inert atmosphere from containing polar materials such as water, oxygen, and others which become catalyst poisons since the milled product is highly activated.

The time during which the milling is continued differs with the particular milling method and the milling conditions employed. For example, in a vibration mill, the optimum milling time differs with the combination of various conditions such as the quantity of balls used, the quantity of the sample to be milled, the diameters of the balls, and the vibration frequency and amplitude. The milling time can be shortened, of course, by changing the conditions in directions which result in increased milling speed and efficiency as, for example, by increasing the quantity of balls, decreasing the quantity of milled sample, and increasing the vibration frequency and/or amplitude.

The optimum combinations of these milling conditions can be readily determined by those skilled in the art. In this connection, it may be mentioned that, in the case where a vibration mill in which a sealed pot of batch-process type was used in actual practice of this invention, modified titanium trichlorides exhibiting amply improved catalytic performance were obtained with continuous milling times within 100 hours.

The solid composition, i.e., the modified titanium trichloride, obtained after a required time is taken out of the mill into a vessel containing an inert atmosphere, and can then be used as one component of a Ziegler catalyst. For example, this modified titanium trichloride can be used by taking it out from the mill into a dry box containing an argon atmosphere and using the same as a solid or as a slurry formed by suspending it in an inert liquid medium such as, for example, dried and deaerated heptane, as a starting material for the preparation of the catalyst.

1-5. Organoaluminum compounds

For the organoaluminum compound to be combined with the above described modified titanium trichloride to prepare a Ziegler catalyst, a compound representable by the general formula Al $R_n X_{3-n}$ is suitable. In this formula: R is a hydrocarbon residue, particularly an alkyl, more particularly lower alkyl containing up to 6 carbon atoms, or a cycloalkyl, more particularly of a lower cycle alkyl containing up to 8 carbon atoms; X is a hydrogen or halogen atom; and $n$ is 1, 1.5 2, or 3. Specific examples of effective organoaluminums are enumerated below. These compounds may be used singly or in combinations of two or more thereof from the same group of from different groups.

1. trialkylaluminums
    trimethylaluminum
    triethylaluminum
    tri-n-propylaluminum
    tri-iso-propylaluminum
    tri-iso-butylaluminum
    tri-n-hexylaluminum
2. dialkylaluminum halides
    diethylaluminum chloride
    di-n-propylaluminum chloride
    di-iso-butylaluminum chloride
    diethylaluminum bromide
    diethylaluminum iodide
3. alkylaluminum hydrides
    diethylaluminum hydride
    di-n-propylaluminum hydride
    di-iso-butylaluminum hydride
4. Products of reaction of organoaluminum compounds as enumerated above or aluminum hydride and olefins or diolefins such as butadiene and isoprene.

1-6. Cycloheptatriene compounds

The cycloheptatriene compounds including tropylium salts which can be used in the practice of this invention can be classified into various groups. Two or more of these compounds within one group or in different groups can be used together, in which case, of course, the optimum quantities to be used and other variables described hereinafter become different.

Tropylium salts and tropylium complexes

Tropylium salts and tropylium complexes are carbonium salts derived from cycloheptatrienes and, per se, are known compounds, which can be prepared, for example, by the following processes.

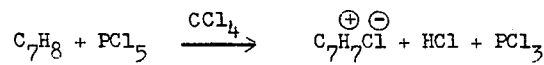

disclosed in Dokl. akad. Nauk, USSR, 113, 339 (1957).

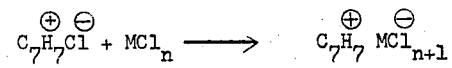

where:
  $MCl_n$ is a Lewis acid;
  M is Fe, Al, Ti, P, Sb, As, Sn, etc.; and
  $n$ denotes the valence of M, as disclosed in J. Chem. Soc., 1961, 2320.

Specific examples of tropylium salts of this character are as indicated by the following symbols wherein T denotes a tropylium group:

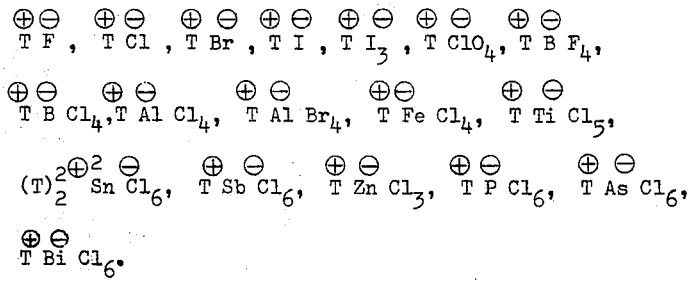

In addition to these salts in which the tropylium group is non-substituted, there are those having halogen-, alkyl-(particularly lower alkyl-), alkoxy-(particularly lower alkoxy-), and aryl-(particularly phenyl-) substituted tropylium groups and benzo derivatives wherein benzene rings are condensed. Specific examples of these substituted tropylium salts are:

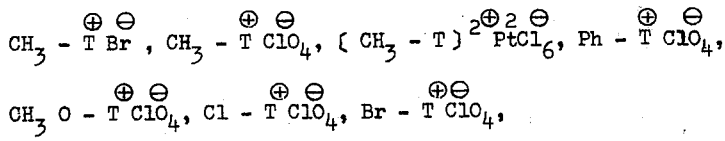

where CH₃—T, Ph—T, Cl—T, and Br—T respectively indicate, methyl-, phenyl-, chloro-, and bromo-substituted tropylium groups.

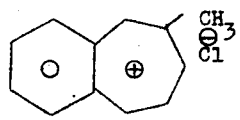 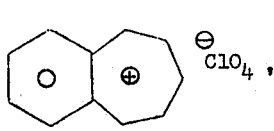

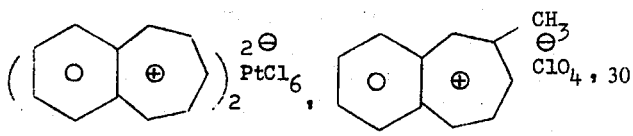

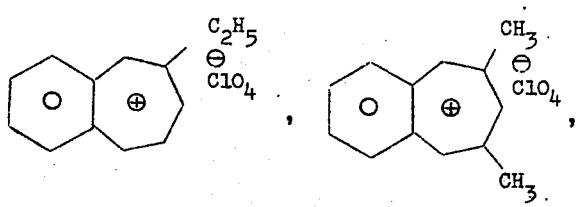

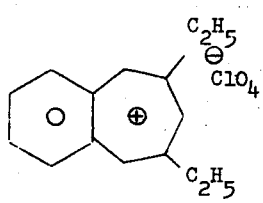

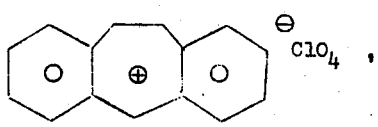

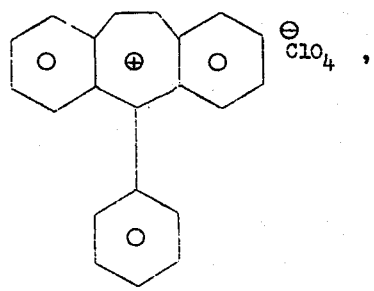

Cycloheptatriene derivatives

These derivatives are representable by the general formula

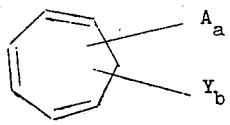

where A is hydrogen (that is, signifying non-substituted), a halogen, an alkyl group, an aryl group, or an aralkyl group (in all cases, the alkyl group or alkyl moiety including cycloalkyls, the carbon content being of the order of from 1 to 20, particularly lower alkyls of $C_1$ to $C_6$, and a phenyl group and a naphthyl group being suitable for the aryl group or aryl moiety) or denotes a condensed benzene group sharing two carbon atoms within this cycloheptatriene ring.

One class of the group Y comprises monovalent polar groups each containing at least one N, S, or O atom bonded thereto. The term "monovalent" is here used in the sense excluding polar groups bonded through a double bond to carbon of a cycloheptatriene as, for example, in the case of a″ = O″ radical.

Within the polar group, the N, S, and O atoms exist by forming bonds of groups such as an amino group, an armide group, an imide group, an isocyanate group, a nitrile group, a nitro group, a nitroso group, a keto group, an aldehyde group, a carboxyl group, a carboxylate group, an ether group, a hydroxyl group, a thioalkoxy group, and a thioether group. Furthermore, these groups may be bonded directly to the cycloheptatriene ring, or they may be bonded thereto through another group such as a hydrocarbon residue containing from 1 to approximately 20 carbon atoms.

Another class of the group Y comprises organic residues, particularly hydrocarbon residues, containing non-benzenoid carbon-carbon multiple bonds such as a cyclopentadienyl group, a cycloheptatrienyl group, an acetylenyl group, a vinyl group, and an allyl group and mono- and polyhalogenated derivatives of these hydrocarbon residues and other hydrocarbon residues.

The subscripts $a$ and $b$ are integers satisfying the relationship $a + b \leq 7$ and are ordinarily 2 or less, respectively, particularly unity (1).

These compounds can be readily synthesized by further introducing desired groups into compounds obtained from or by means of nucleophilic reagents. Most of these compounds are known.

Of these cycloheptatriene compounds, those with one polar group are ordinarily preferred. Specific examples are as follows.

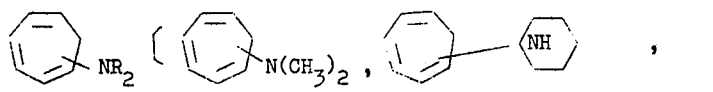
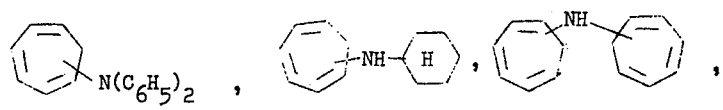
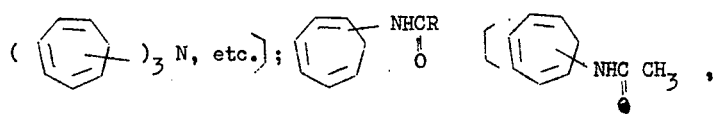
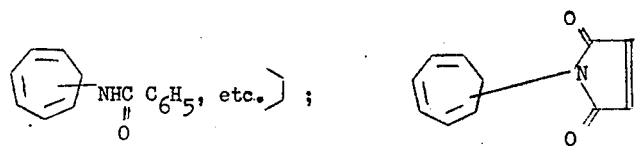
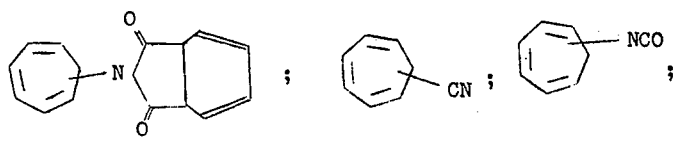
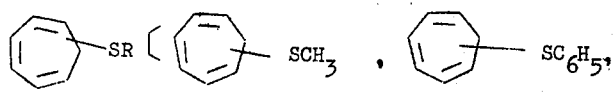
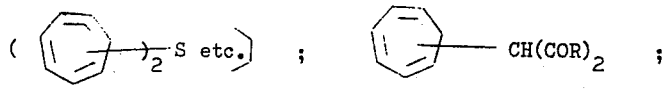
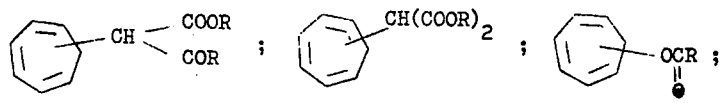
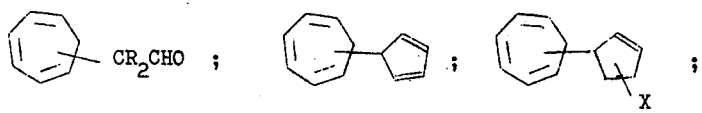
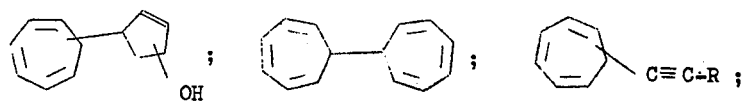
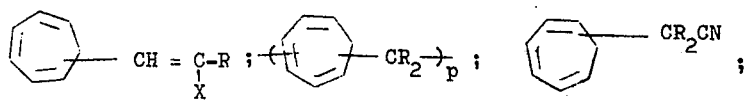

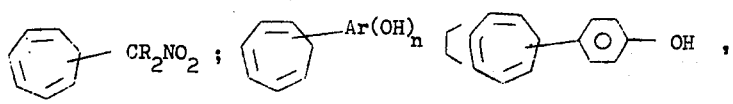
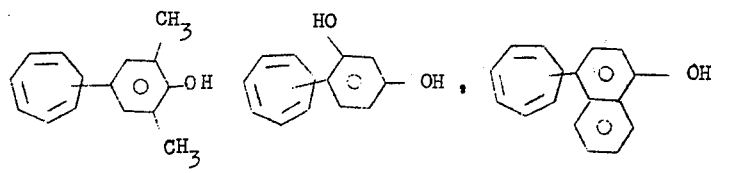
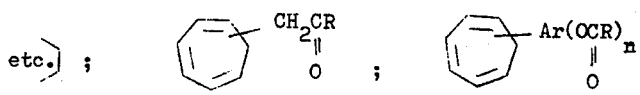
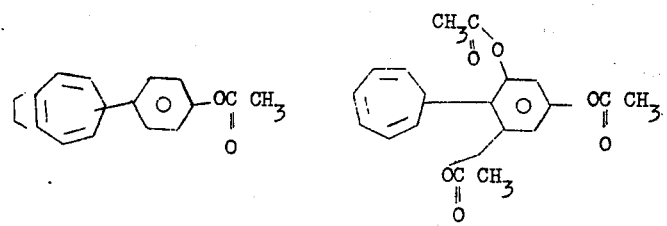
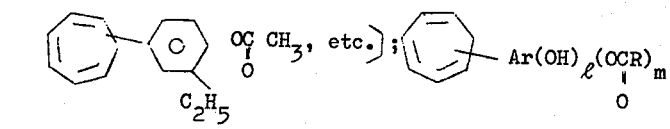
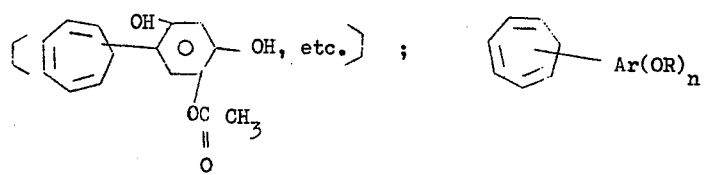
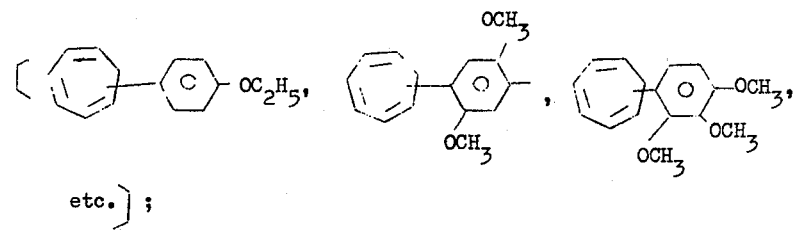
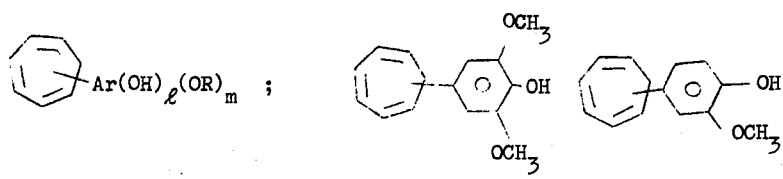
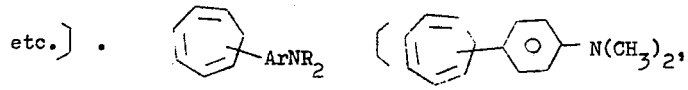
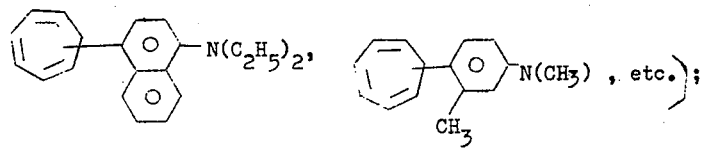
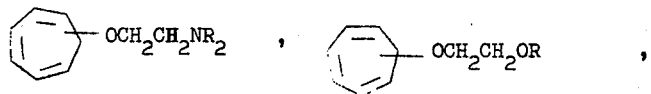
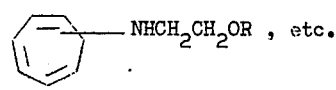

In each of these compounds, the substitution position of the cycloheptatriene nucleus can be selected at will.

In addition, similar compounds wherein an alkyl group, an aryl group, and an aralkyl group are respectively bonded to the cycloheptatriene ring and similar compounds with a condensed benzene ring can be used.

In these formulas, the character R denotes a hydrogen atom or a hydrocarbon residue of from $C_1$ to $C_{20}$ Here, R' denotes a hydrocarbon residue of from $C_1$ to $C_{20}$ or such a hydrocarbon residue with an alkoxy group or a (hydrocarbyl) amino group bonded thereto. Y' is a hydrocarbon of from $C_1$ to $C_{20}$, a halogen, or a substitutent Y as described above with respect to the cycloheptatriene derivatives. $a'$ and $b'$ are integers satisfying the relationship $a' + b' \leq 6$, being ordinarily of the order of 2 or less, particularly unity (1).

Specific examples of these compounds are as follows.

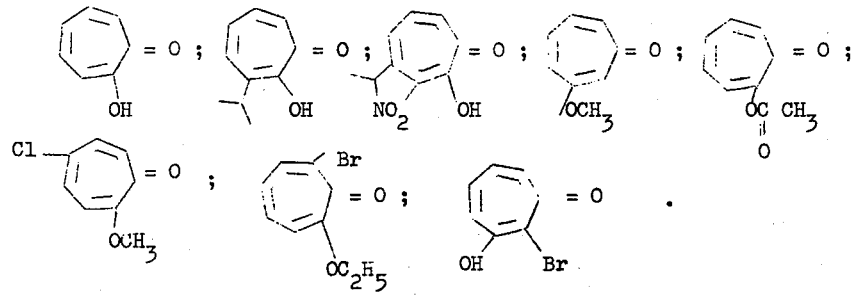

Where a plurality of R's are indicated, they may be different or the same, or they may be coupled by forming a ring. Ar denotes an aryl residue. Characters l, m, and n are integers satisfying the following relationships.

l + m + 1 (unity) ≦ (maximum number of Ar substitutable for aromatic nucleus)

n + 1 (unity) ≦ (same as above)

Character X represents any of the halogen atoms F, Cl, Br, and I. p is an integer P ≧ 2.

Of these compounds, the following are especially effective.

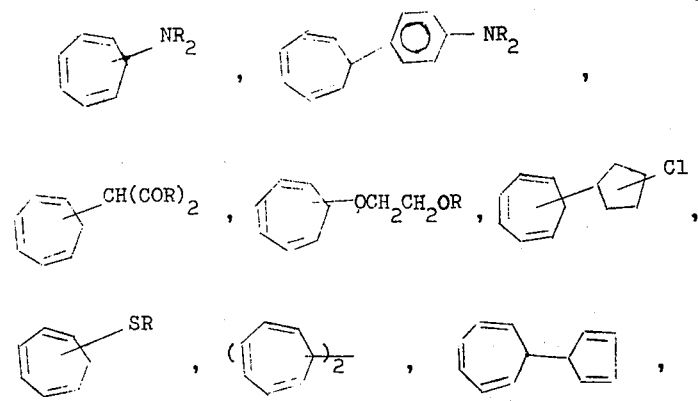

The character R is the same as before, but is of $C_1$ to $C_{10}$, H or a methyl group being preferable therefor. Still more specific examples are N,N-dimethylcycloheptatriene, p-tropyl-N,N-dimethylaniline, tropylacetylacetone, tropylchlorocyclopentene, methyl tropyl ether, methyltropylthioether, ditropyl, tropylcyclopentadiene, and tropylmethoxyethylether.

Tropolone and derivatives thereof

Tropolone and derivatives thereof are represented by the following general formulas,

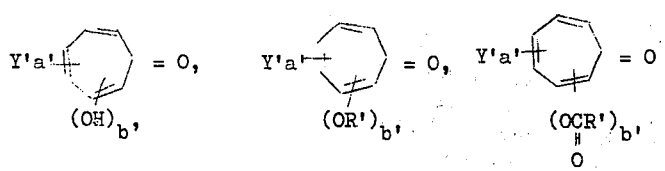

Of the compounds, a particularly effective compound is

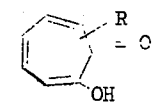

Here, R is as before, but is of from $C_1$ to $C_{10}$, H or a methyl group being preferable therefor. More specific examples are tropolone and hinokitiol.

Tropone and derivatives thereof

Tropone and its derivatives are represented by the general formula

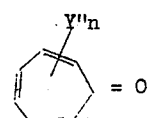

where:

Y'' denotes either A or Y, and $n$ is an integer satisfying the relationship $n \leq 6$.

A specific example of an especially effective compound is tropone.

Compounds set forth in the specification of Dutch Patent No. 6902197

In this patent specification, cycloheptatriene-1,3,5 and alkyl, aryl, and alkoxy derivatives (the number of carbon atoms in the alkyl and alkoxy residue being from 1 to 4, respectively,) thereof are mentioned. These cycloheptatriene and derivatives thereof also can be effectively used in the practice of the present invention. Specific examples are cycloheptatriene, methoxycycloheptatriene, methylcycloheptatriene, and dimethylcycloheptatriene.

1-7. Catalyst preparation

Preparation procedure

The catalyst system comprising basically of a combination of the above described three indispensible ingredients can be formed by mixing these three ingredients in the presence or absence of an inert dispersion medium, preferably in an inert gas atmosphere, either all at one time or in stages. For example, a modified titanium trichloride and a cycloheptatriene compound can be first mixed, and then, after a certain time, an organoaluminum compound can be admixed with the resulting first mixture.

One example of the mixing sequence is that of organoaluminum-modified titanium trichloride-cycloheptatriene compound. Depending on the type of the cycloheptatriene compound, however, a special adding sequence may be required. More specifically, for example, the above mentioned tropone and derivatives thereof (1) should be mixed beforehand with the organoaluminum compound ingredient and then supplied to the polymerization system, or (2) should be supplied to the polymerization system separately from the modified titanium trichloride ingredient and the organoaluminum compound ingredient.

Any of various procedures carried out for this type of catalyst preparation as, for example, curing, milling of all ingredients before mixing or after mixing, and milling with other components, can be carried out.

Quantitative ratios

The proportions or quantitative ratios in which these three ingredients (I), (II), and (III) are used can be selected to suit the purpose of the process. As one example, a suitable quantity, in mole ratio, of the cycloheptatriene compound is of the order of from 0.001 to 10 times, preferably from 0.01 to 10 times, that of the halogenated titanium. In this connection, it is to be noted that an excessive additive quantity of a cycloheptatriene compound may inhibit the polymerization. The mole ratio of organoaluminum compound/titanium halide, for example, is from 0.05 to 50, preferably from 1 to 30.

2. Polymerization of the α-olefin

Except for the use of a catalyst as described above, the process for producing α-olefin polymers according to this invention does not differ substantially from any of those which can be used for this type of polymerization. Accordingly, this process can be accomplished by carrying out homopolymerization of an α-olefin or copolymerization of α-olefins or of an α-olefin with another monomer copolymerizable therewith in the presence or absence of an inert organic solvent or with a monomer for polymerization such as the above mentioned α-olefin as a solvent or in a vapor phase.

Examples of the above mentioned α-olefins for this process are ethylene, propylene, butene-1, 4-methylpentene-1, styrene, and mixtures of ethylene and propylene of the ethylene content of from 1 to 30 mole percent of (ethylene + propylene). Examples of the above mentioned other monomer copolymerizable with the α-olefin are norbornadiene, ethyldenenorbornane, and dicyclopentadiene. Examples of the above mentioned inert organic solvents are hydrocarbons such as benzene, toluene, xylene, pentane, hexane, heptane, and cyclohexane and halohydrocarbons such as chlorobenzene and methylene chloride.

The conditions of this polymerization or copolymerization are a suitable temperature, for example, of the order of from 0° to 200°C, preferably from 30° to 150°C, and a suitable pressure, for example, of the order of from standard atmospheric pressure to 100 standard atmospheres, preferably from standard atmospheric pressure to 60 standard atmospheres. The reaction is carried with or without the use of a molecular weight modifier such as hydrogen.

A catalyst system according to this invention exhibits its desirable characteristics most effectively when used in the polymerization of an α-olefin in a state wherein an inert polymerization solvent is substantially not present, that is, in a solventless state.

The expression "a state wherein a polymerization solvent is substantially not present" is herein intended to include, in addition to the case where absolutely no inert polymerization solvent is present, the case wherein a polymerization solvent is present, in a small quantity of an order, for example, 5 percent by weight of the polymer, which is insufficient for saying that the formed polymer is in a slurry state.

Accordingly, the use of a modified titanium trichloride prepared by wet-type milling methods and those prepared by combining with an organoaluminum compound to form a catalyst and causing this catalyst to be suspended in a small quantity of an organic solvent is intended to fall within the purview of the practice of this invention. The term "polymerization solvent" as used herein is not intended to include a monomer which is in liquefied state.

Thus, one of the representative examples of the polymerization system according to the invention is that of the method wherein a gaseous monomer is caused to contact a catalyst dispersed in solid state under polymerization reaction conditions and thereby to polymerize, that is, the gas-phase polymerization method. Another example is that of the method wherein a liquefied monomer is used as a polymerization medium, that is, the liquid-phase, solventless method.

3. Experimental Examples

In order to indicate more fully the nature and utility of this invention, the following experimental examples illustrating preferred embodiments of the invention and reference examples are set forth, it being understood that these examples are presented as illustrative only and that they are not intended to limit the scope of the invention.

EXAMPLE 1.

A stainless-steel pot of 0.7-liter capacity was provided with 600 ml. (apparent or bulk volume) of stainless-steel balls of 12.7-mm. diameter and then charged with 50 grams (g.) of titanium trichloride, produced by reduction of titanium tetrachloride with titanium metal by the Toho Titanium Company, Japan, and 3.5 g. of tellurium tetrachloride, which were thus sealed in and then milled in an atmosphere of argon and under vibration produced by vibrator for 72 hours. The operational conditions of this vibration mill was a vibration amplitude of 3.5 mm. and a motor rotational speed of 1,410 rpm.

As a result of this milling, a fine powder of a titanium trichloride composition was obtained and 1 g. of this titanium trichloride composition was taken out in a dry box and rendered into a slurry in 100 ml. of heptane. To this slurry, tropylium tetrachloroaluminate was further added in a quantity 0.3 times that of the titanium trichloride in terms of mole ratio, and the resulting catalyst was used in the following polymerization of propylene.

30 g. of dry polypropylene separately synthesized as a catalyst dispersion medium was placed in a stainless steel autoclave of 2-liter capacity provided with an anchor-shaped agitator of electromagnetic induction type and a temperature control device, and the autoclave interior was subjected to several repeated cycles of de-aeration and propylene substitution (purging). Next, 1.2 ml. of a solution of triethylaluminum in heptane of a concentration of 25 percent by weight was added to the process materials, and, as agitation was continued, 2 ml. of a heptane slurry of the above mentioned titanium trichloride composition containing the tropylium tetrachloroaluminate was added to the process materials. Then, propylene was supplied into the autoclave, and polymerization was started and carried out for 3 hours under polymerization conditions of a temperature of 95°C and a propylene pressure of 50 kg/cm², G.

After, polymerization, the propylene gas remaining in the autoclave was purged, and then the autoclave was opened. As a result, 312 g. of polypropylene in powder form was obtained. Accordingly, the yield of the polypropylene produced by this polymerization is 282 g. after subtraction of 30 g. of polypropylene as the dispersion medium. This is equivalent to a yield of 14.1 kg. of polypropylene per gram of the titanium trichloride composition.

This polypropylene was subjected to extraction with boiling n-heptane for 12 hours, whereupon the extraction residue was 94.0 percent, which had been corrected for the quantity due to the dispersion medium. A heptane extraction residue thus corrected will be hereinafter designated by the abbreviation I.I.

Furthermore, the polypropylene was subjected to extraction with boiling ether for 6 hours, whereupon the ether-soluble component was 2.1 percent, also corrected for the dispersion medium similarly as with the I.I. An ether-soluble component value thus corrected will be hereinafter designated by E.S. Furthermore, the melt index (hereinafter abbreviated M.I.) at a temperature of 150°C and a load of 10 kg. was 0.01.

EXAMPLES 2 AND 3

Propylene was polymerized in accordance with the procedure and under the same conditions as set forth in Example 1 except for changing the additives added to the slurry of the titanium trichloride composition mentioned in Example 1 to methyltropylether and tropylchlorocyclopentene. The results are as follows.

| Example | Additive added to TiCl₃ composition slurry | Polypropylene Yield (g) | I.I. (%) | E.S. (%) |
|---|---|---|---|---|
| 2 | methyltropylether | 242 | 94.1 | 2.3 |
| 3 | tropylchlorocyclopentene | 138 | 88.2 | 5.2 |

EXAMPLE 4

50 g. of titanium trichloride produced by reduction of titanium tetrachloride with titanium metal by the Toho Titanium Company was milled in the presence of 11 g. of silicon tetrachloride in place of tellurium tetrachoride and under the same conditions and by means of the vibration mill specified in Example 1, whereupon a titanium trichloride composition in the form of a fine powder of light easily flowing nature was obtained.

One gram of this titanium trichloride composition was rendered into a slurry in 100 ml. of heptane, and methyltropylether was added thereto in a quantity in terms of mole ratio with respect to the titanium trichloride of 0.3.

With the use of 2 ml. of this slurry of the titanium trichloride composition modified with silicon tetrachloride and methyltropylether, propylene was polymerized for 3 hours at a temperature of 85°C, a propylene pressure of 35 kg./cm² G, and other conditions as specified in Example 1.

As a result, 191 g. of a polypropylene was formed. This quantity corresponds to a yield of polypropylene of 9.54 kg. per gram of the solid titanium trichloride composition. The I.I. was 94.0 percent, and the E.S. was 3.2 percent.

EXAMPLES 5 AND 6

Titanium trichloride was milled under the same conditions as those set forth in Example 4 except for an increase in the quantity of the silicon tetrachloride to 22 g., whereupon a titanium trichloride composition in the form of a fine powder was obtained.

Two identical lots of a slurry, each formed with 1 g. of this TiCl₃ composition and 100 ml. of heptane were prepared. To these two lots of the slurry, tropylchlorocyclopentene (Example 5) and N,N-dimethylaminotropylidene (Example 6) were added in quantities respectively in terms of mole ratio with respect to the TiCl₃ of 0.3.

With the use of 2 ml. of each of the resulting modified TiCl₃ composition slurries and 0.8 ml. of a triethylaluminum solution in heptane of a concentration of 25 percent by weight, propylene was polymerized for 3 hours at 95°C and 45 kg/cm² G by the procedure set forth in Example 1, whereupon the following results were obtained.

| Example No. | Additive added to TiCl₃ composition slurry | Polypropylene yield (g.) | I.I. (%) | E.S. (%) |
| --- | --- | --- | --- | --- |
| 5 | tropylchlorocyclopentene | 206 | 92.4 | 3.1 |
| 6 | N,N-dimethylaminotropylidene | 105 | 94.3 | 2.7 |

EXAMPLE 7

Propylene was polymerized by the procedure and under the conditions set forth in Example 1 except for the use of 0.8 ml. of a solution of triethylaluminum in heptane of 25 percent by weight concentration and 1 liter (standard conditions) of hydrogen as a molecular weight modifier.

As a result, a polypropylene of an I.I. of 92.3 percent, an E.S. of 3.2 percent, and a M.I. of 1.2 was obtained in a yield of 269 g.

Reference Example 1:

Propylene was polymerized by the procedure and under the conditions of Example 7 except that tropylium tetrachloroaluminate was not used.

As a result, a polypropylene of an I.I. of 85.3 percent, an E.S. of 5.8 percent, and a M.I. of 6.7 was obtained in a yield of 320 g.

Reference Examples 2 and 3:

Propylene was polymerized by the procedure and under the conditions set forth in Example 7 except for the use, in place of the tropylium tetrachloroaluminate, of hexamethylphosphorotriamide in quantities in terms of mole ratios with respect to the TiCl₃ of 0.5 (Reference Example 2) and 1.0 (Reference Example 3).

The following results were obtained.

| Ref. Example No. | Hexamethylphosphorotriamide quantity (P/Ti mole ratio) | Polypropylene yield (g.) | I.I. (%) | E.S. (%) | M.I. |
| --- | --- | --- | --- | --- | --- |
| 2 | 0.5 | 160 | 83.1 | 6.7 | 10.0 |
| 3 | 1.0 | 110 | 80.4 | 7.9 | 13.5 |

EXAMPLE 8

A catalyst system comprising a TiCl₃ composition modified by the procedure of Example with the use of 5 g. of carbon tetrachloride in place of tellurium tetrachloride, tropylchloropentene in a quantity in terms of mole ratio relative to TiCl₃ of 0.3, and triethylaluminum was used in the polymerization of propylene under the conditions and by the procedure set forth in Example 1.

As a result a polypropylene of an I.I. of 90.0 percent and an E.S. of 4.0 percent was obtained in a yield of 256 g.

EXAMPLE 9

One gram of the TiCl₃ composition powder described in Example 4 was rendered into a slurry with 100 ml. of heptane, and to this slurry, methoxyethyltropylether was added in a quantity in terms of mole ratio relative to the TiCl₃ of 0.1.

With the use of 2 ml. this TiCl₃ composition slurry thus modified with silicon tetrachloride and methoxyethyltropylether and 1.0 ml of a solution of triethylaluminum in heptane of 25-percent by weight concentration, propylene was polymerized for 3 hours at 95°C and 40 kg/cm²G by the procedure and the apparatus set forth in Example 1.

As a result, 393 g. of a polypropylene was produced. This represents a high yield of 19.6 kg. of polypropylene per gram of the solid TiCl₃ compositions. The I.I. was 92.1 percent, and the E.S. was 3.0 percent.

EXAMPLE 10

One gram of the TiCl₃ composition modified with silicon tetrachloride and obtained according to Example 4 was rendered into a slurry with 100 ml. of heptane, and to this slurry, ditropyl was added in a quantity in terms of mole ratio relative to TiCl₃ of 0.3.

With the use of 4 ml. of this TiCl₃ composition slurry thus modified with silicon tetrachloride and ditropyl, 1.6 ml. of a solution of diethylaluminum monochloride of a concentration of 25 percent by weight, and 1 liter (standard conditions) of hydrogen, propylene was polymerized for 3 hours with the apparatus and by the procedure of Example 1 at 85°C and 35 kg/cm²G.

As a result, a polypropylene of an I.I. of 98.0 percent, an E.S. of 1.0 percent, and a M.I. of 0.8 was produced in a yield of 104 g.

The following table shows the results of polymerization of propylene through the use of TiCl₃ compositions prepared by comilling with tellurium tetrachloride.

| Example No. | Additive added to TiCl₃ composition slurry | Additive to Ti (mole ratio) | Hydrogen (Std.) ene cond. (l) | Polypropylene yield (g.) | I.I. (%) | E.S. (%) |
| --- | --- | --- | --- | --- | --- | --- |
| Ref. Ex. 1 | — | — | 1 | 320 | 85.3 | 5.8 |
| Ref. Ex. 2 | hexamethylphosphorotriamide | 0.5 | 1 | 160 | 83.1 | 6.7 |
| Ref. Ex. 3 | (ditto) | 1.0 | 1 | 110 | 80.4 | 7.9 |
| Ex. 7 | tropylium tetrachloroaluminate | 0.3 | 1 | 269 | 92.3 | 3.2 |

The results as shown in this table suggest that hexamethylphosphorotriamide, which is a known agent for improving stereospecificity, not only fails to act with especial effectiveness on the $TiCl_3$ composition modified with tellurium tetrachloride which is effective in the practice of this invention but even gives rise to an increasing deterioration of the catalyst performance with increase in the quantity of this agent hexamethylphosphorotriamide. In contrast, in the case where a tropylium tetrachloroaluminate according to this invention is used, there is only a little lowering of the activity, and the effect of improving the I.I. and E.S. values is remarkable.

This fact indicates how difficult it is to predict the synergism arising from respectively independent elements due to the combination of the following two measures (1) and (2), which are elements for improvement of Ziegler-Natta catalysts and differ in effect.

1. Co-mill the aforementioned specific compound and the $TiCl_3$.
2. Add additives to the $TiCl_3$ slurry.

EXAMPLE 11

20 g. of a separately synthesized, dried polypropylene was placed as catalyst dispersion medium in a stainless-steel autoclave of 1-liter capacity. Deaeration and propylene substitution were repeated several times. Then 2 ml. of a solution of triethyl-aluminum in heptane of a concentration of 10 percent by weight, 2 ml. of a heptane slurry containing 20 mg. of the $TiCl_3$ composition modified with $SiCl_4$ as described in Example 4, and 1.0 ml. of a solution in benzene containing 4.1 mg. of tropone were introduced in the order named into the autoclave, and polymerization of the propylene was carried out for 2 hours at 85°C and 35 kg/cm² G.

As a result, a polypropylene of an I.I. of 95.5 percent and an E.S. of 3.0 percent was produced in yield, excluding the dispersion medium, of 111 g.

EXAMPLE 12

$TiCl_3$ and hexachlorobenzene were co-milled under the conditions set forth in Example 1 except for the addition of hexachlorobenzene in a quantity in terms of mole ratio relative to the $TiCl_3$ of 0.1 in place of the tellurium tetrachloride and a co-milling time of 50 hours.

Into an autoclave containing 30g. of a separately synthesized polypropylene used as a dispersion medium, 0.96 ml. of a solution of triethylaluminum in heptane of a concentration of 25 percent by volume, 2.0 ml. of a heptane slurry the above described modified $TiCl_3$ composition (10 g./liter), and 0.5 ml. of a heptane solution containing methoxyethyltropylether in a quantity corresponding to a mole ratio of 0.2 relative to the $TiCl_3$ were introduce in the sequence named, and propylene was polymerized for 3 hours at 95°C. and 40 kg./cm²G.

As a result, a polypropylene of a surprisingly high I.I. of 97.8 percent was produced in a yield of 220 g.

EXAMPLE 13

Co-milling was carried out under the conditions of Example 1 except for the addition of hexachlorocyclopentadiene in a quantity in terms of mole ratio relative to the $TiCl_3$ of 1/20 in place of the tellurium tetrachloride and a co-milling time of 50 hours.

Propylene was then polymerized under the conditions of Example 12 except for the use of 2.0 ml. of a heptane slurry (10 g./liter) of the above described modified $TiCl_3$ composition.

As a result, a polypropylene of a high I.I. of 97.5 percent was produced in a yield of 285 g.

EXAMPLE 14

Co-milling was carried out under the conditions of Example 1 except for the addition of 1,5-dichloropentane in a quantity in terms of mole ratio relative to the $TiCl_3$ of 1/5 in place of the tellurium tetrachloride and a co-milling time of 50 hours.

Propylene was then polymerized under the conditions of Example 12 except for the use of 2.0 ml. of a slurry of this modified $TiCl_3$ composition in heptane (10 g./liter).

As a result, a polypropylene of a high I.I. of 98.0 percent was produced in a yield of 283 g.

EXAMPLE 15

Benzyl chloride was added in a quantity of 1/5 in terms of mole ratio relative to the $TiCl_3$ instead of tellurium tetrachloride and was then co-milled with the $TiCl_3$ for 50 hours under the conditions of Example 1.

Propylene was then polymerized under the conditions of Example 12 except for the use of 2.0 ml. of a slurry of this modified $TiCl_3$ composition in heptane (10 g./liter).

As a result, a polypropylene of an I.I. of 96.3 percent was produced in a yield of 261 g.

Throughout the foregoing Examples and Reference Examples, the $TiCl_3$ used in the co-milling step was a $TiCl_3$ of $\alpha$ type.

We claim:

1. A process for producing $\alpha$-olefin polymers which comprises contacting an $\alpha$-olefin with a catalyst system prepared by combining
   I. a solid composition prepared by milling titanium trichloride, obtained by reducing titanium tetrachloride with metallic titanium, in the presence of, as modifier,,
      1. a halohydrcarbon selected from the group consisting of dichloropropanes, dibromopropanes, dichlorobutanes, 1,5-dichloropentane, hexachlorocyclopentadiene, benzyl chloride and hexachlorobenzene,
      2. silicon tetrachloride or
      3. tellurium tetrachloride,
   II. an organoaluminum compound and
   III. a cycloheptatriene compound selected from the group consisting of tropylchlorocyclopentene and methoxyethyltropylether.

2. A process for producing $\alpha$-olefin polymers according to claim 1 in which the mole ratio of the halohydrocarbon to the titanium trichloride is from 0.02 to 1.0.

3. A process for producing $\alpha$-olefin polymers according to claim 1 in which the modifier is selected from the group consisting of dichloropropanes, dibromopropanes, dichlorobutanes and 1,5-dichloropentane.

4. A process for producing α-olefin polymers according to claim 1 in which the modifier is hexachlorocyclopentadiene.

5. A process for producing α-olefin polymers according to claim 1 in which the modifier is selected from the group consisting of benzyl chloride and hexachlorobenzene.

6. A process for producing α-olefin polymers accordingg to claim 1 in which the organoaluminum compound is represented by the formula Al $R_nX_{3-n}$, where R is a hydrocarbon group, X is a member selected from the group consisting of hydrogen and halogen; and $n$ is 1, 1.5, 2 or 3.

7. A process for producing α-olefin polymers according to claim 6 in which R is an alkyl group containing up to 6 carbon atoms, and X is chlorine.

8. A process for producing α-olefin polymers according to claim 6 in which R is a cycloalkyl group containing up to 6 carbon atoms, and X is chlorine.

9. A process for producing α-olefin polymers according to claim 1 in which the α-olefin is a member selected from the group consisting of ethylene, propylene and butene-1.

10. A process for producing α-olefin polymers according to claim 9 in which the α-olefin is ethylene.

11. A process for producing α-olefin polymers according to claim 9 in which the α-olefin is propylene.

12. A process for producing α-olefin polymers according to claim 9 in which the α-olefin is a mixture of ethylene and propylene in which the ethylene content is from 1 to 3 mole percent of the mixture.

13. A process for producing α-olefin polymers according to claim 1 in which said catalyst system contains from 0.001 to 10 moles of the cycloheptatriene compound per mole of the titanium trichloride.

* * * * *